United States Patent [19]

Miller

[11] Patent Number: 5,203,815
[45] Date of Patent: Apr. 20, 1993

[54] APPARATUS FOR CARRYING FISHING EQUIPMENT

[76] Inventor: Richard A. Miller, 5134 Valley Stream Rd., Charlotte, N.C. 28209

[21] Appl. No.: 825,555

[22] Filed: Jan. 24, 1992

Related U.S. Application Data

[63] Continuation-in-part of Ser. No. 572,025, Aug. 24, 1990, Pat. No. D. 323,413.

[51] Int. Cl.⁵ .................................................. B62B 1/26
[52] U.S. Cl. ..................................... 43/21.2; 280/684; 280/47.26; 211/149
[58] Field of Search ........................... 43/54.1, 21.2, 4; 280/47.19, 47.26, 684; 108/111, 134, 92, 152; 211/132, 150, 149; 248/240, 240.4, 98; D34/26

[56] References Cited

U.S. PATENT DOCUMENTS

| | | | |
|---|---|---|---|
| 3,052,484 | 9/1962 | Huffman et al. | 280/654 |
| 3,074,734 | 1/1963 | Munson et al. | 280/47.35 |
| 4,355,818 | 10/1982 | Watts | 280/47.19 |
| 4,478,428 | 10/1984 | Ziliani | 280/47.35 |
| 4,846,486 | 7/1989 | Hobson | 280/47.26 |
| 4,865,346 | 9/1989 | Carlile | 280/654 |

FOREIGN PATENT DOCUMENTS

2053102 2/1991 United Kingdom ................ 280/654

Primary Examiner—Richard K. Seidel
Assistant Examiner—Jeanne M. Elpel
Attorney, Agent, or Firm—Ralph H. Dougherty

[57] ABSTRACT

Apparatus for carrying fishing equipment which includes a support member or brace, first and second load bearing members or shelves, a mechanism for connecting load bearing member and concurrently collapsing and opening same relative to the support member, and a mechanism for receiving fishing rods on the apparatus. The apparatus is provided with at least one wheel rotatably mounted thereon. The first shelf is rotatably mounted on the brace. The second shelf is rotatably mounted on the brace above the first shelf. The collapsing mechanism connects the first shelf to the second shelf and provides for concurrent collapsing and opening of the first and second shelves relative to the brace. The mechanism for receiving fishing rods on the apparatus includes at least one rod holder mounted on the shelves.

11 Claims, 4 Drawing Sheets

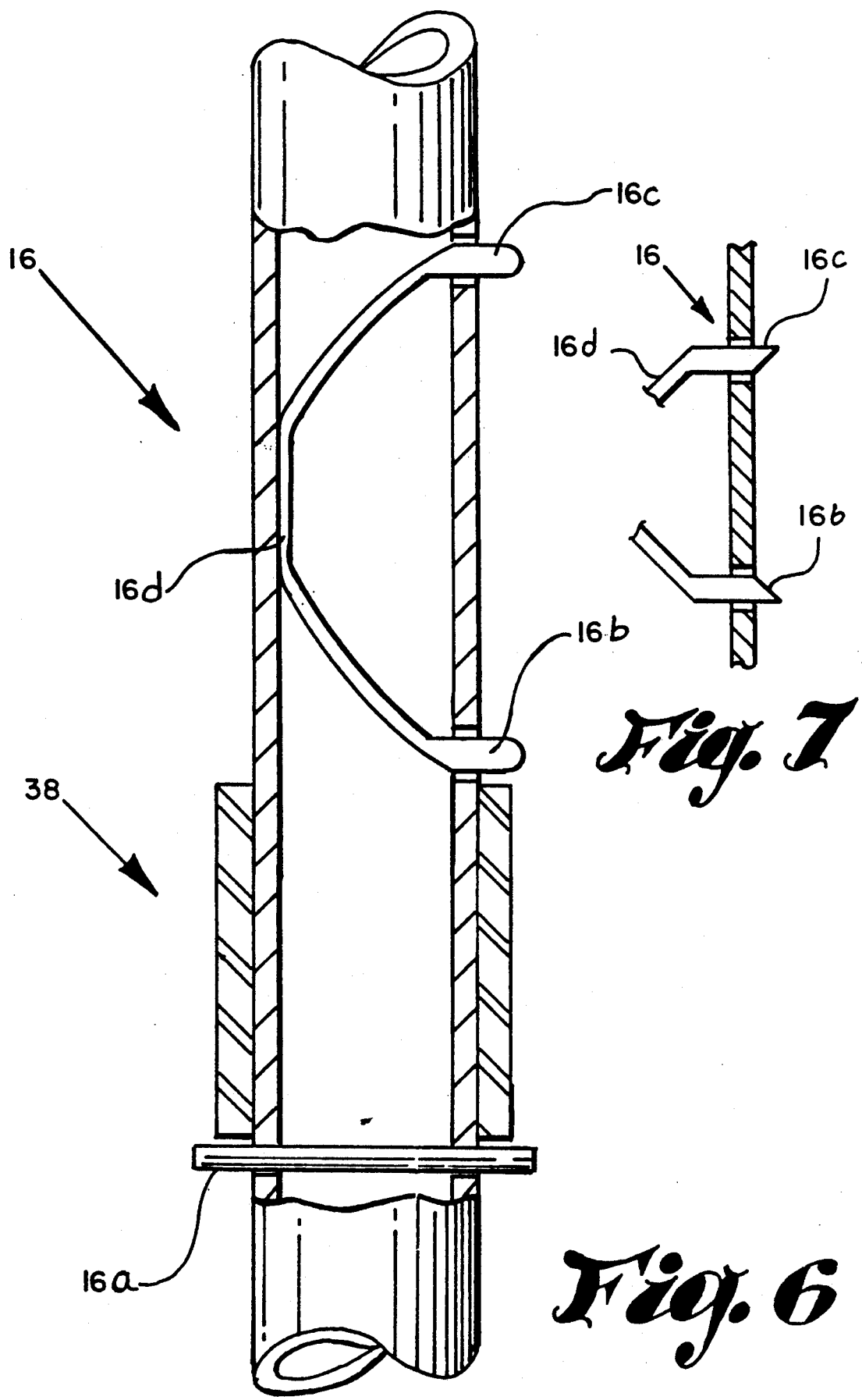

APPARATUS FOR CARRYING FISHING EQUIPMENT

CROSS REFERENCE TO RELATED APPLICATION

This application is a continuation-in-part of my co-pending U.S. patent application Ser. No. 07/572,025, filed Aug. 24, 1990, now U.S. Pat. No. 323,413.

BACKGROUND OF THE INVENTION

1. Field of the Invention

The present invention relates to articles for handling equipment, and more particularly, to an apparatus for carrying fishing equipment.

2. Description of Related Art

Fishing is an extremely popular pastime, both in the United States and in the rest of the world. The sport takes many forms (e.g., stream fishing, deep sea fishing, etc.), however, most of those forms require the fisherman to make use of various fishing equipment. For example, angling, by definition, requires a fishing rod and a line. Assorted lures, hooks, and miscellaneous tools may also be employed. Other than the rod, these items are typically carried in a tackle box. Food, drink, and other refreshments may also be desireable items to accompany the fisherman on a fishing outing. Typically, these items are transported in an ice box or other box-like container. As the amount of equipment and other items desired to be taken on an outing increases, so does the difficulty in transporting that equipment to the fishing site.

Attempts to solve the problem of transporting fishing equipment to a fishing site have resulted in the development of assorted carts for carrying the equipment. Some carts are collapsible, others are not. Of the carts which are collapsible, they typically suffer from the disadvantage that they include complicated and cumbersome mechanisms for collapsing the cart. In addition, the mechanism for collapsing these carts typically compromise the load bearing capacity of the cart by diminishing the space available for equipment. The present invention is directed to a cart which avoids these, and other, disadvantages inherent in prior fisherman's carts.

Applicant is aware of the following U.S. Patents concerning carts for carrying equipment.

| U.S. Pat. No. | Expires | Inventor | Title |
| --- | --- | --- | --- |
| 3,780,466 | 12-25-1990 | Hadnot | DEVICE FOR HOLDING FISHING RODS |
| 3,804,432 | 04-16-1991 | Lehrman | COLLAPSIBLE CART |
| 4,355,818 | 10-26-1999 | Watts | FISHERMAN'S CART |
| 4,448,434 | 05-15-2001 | Anderson | COLLAPSIBLE HAND TRUCK |
| 4,749,209 | 06-07-2005 | Edmonds | COLLAPSIBLE FISHING GEAR AND LOAD BEARING CARRIAGE |
| Des. 286,699 | 11-11-2000 | Thomas, Jr. | FISHERMAN'S CART, OR SIMILAR ARTICLE |
| Des. 246,359 | 11-15-1991 | Powers | CART FOR FISHING EQUIPMENT |
| Des. 264,888 | 06-08-1996 | Watts | FISHERMAN'S CART |

Thomas, Powers, and Watts '888 are all design patents relating fisherman's carts. These design patents teach carts which differ from the present invented apparatus for carrying fishing equipment in structure, operation, and result. The remaining patents, Hadnot, Lehrman, Watts '818, Anderson, and Edmonds are utility patents relating to carts.

Hadnot relates to a device for holding a plurality of fishing rods and is so constructed that a movement of the fishing rod will cause a signaling device to be actuated. Edmonds relates to a combination collapsible carriage for fishing gear and seating which is convertible to a load bearing unit, suitable for shopping, gardening and the like. The structure, operation, and result of the Hadnot and Edmonds devices are clearly distinct from the subject invention.

Lehrman relates to a collapsible cart having upper and lower supports for supporting laundry baskets or the like. Anderson relates to wheeled carriers that are collapsible to a minimum dimension for hand carrying and storing. Watts '818 relates to a wheeled cart constructed for use by fisherman in transporting their fishing gear and paraphernalia from a vehicle to a fishing site.

The present invented apparatus for carrying fishing equipment differs in structure, operation, and result from the related art. The present invented apparatus includes, among other elements, a unique linkage system for simultaneously collapsing the upper and lower supports, and rod holders employing a locking mechanism.

SUMMARY OF THE INVENTION

The present invention is an apparatus for carrying fishing equipment which includes a moveable support member or brace, first and second load bearing members or shelves, a mechanism for connecting the load bearing members and concurrently collapsing and opening the same relative to the support member, and a mechanism for receiving fishing rods on the apparatus. The apparatus is provided with at least one wheel rotatably mounted thereon. The first shelf is rotatably mounted on the brace. The second shelf is rotatably mounted on the brace above the first shelf. The collapsing mechanism connects the first shelf to the second shelf and provides for concurrent collapsing and opening of the first and second shelves relative to the brace. The mechanism for receiving fishing rods on the apparatus includes at least one rod holder mounted on the shelves.

OBJECTS OF THE INVENTION

A primary object of the invention is to provide an apparatus for carrying fishing equipment having means for collapsing and opening the apparatus.

A further object of this invention is to provide an apparatus for carrying fishing equipment which is capable of withstanding the wear and tear typical in connection with fishing outings.

Another object of the invention is to provide an apparatus for carrying fishing equipment which is easy to transport and to operate.

Another object of the invention is to provide an apparatus for carrying fishing equipment which is easy to manufacture.

A further object of the invention is to provide an apparatus for supporting a human in a seated position.

BRIEF DESCRIPTION OF THE DRAWINGS

The foregoing and other objects will become more readily apparent by referring to the following detailed description and the appended drawings in which:

FIG. 6 is an elevational view of a portion of the left side arm of the brace with a portion removed to illustrate the spring loaded first and second engagers.

FIG. 7 is an elevational view of a portion of the left side arm of the brace with a portion removed to illustrate an alternative embodiment of the spring loaded first and second engagers.

DETAILED DESCRIPTION

Figure 1:
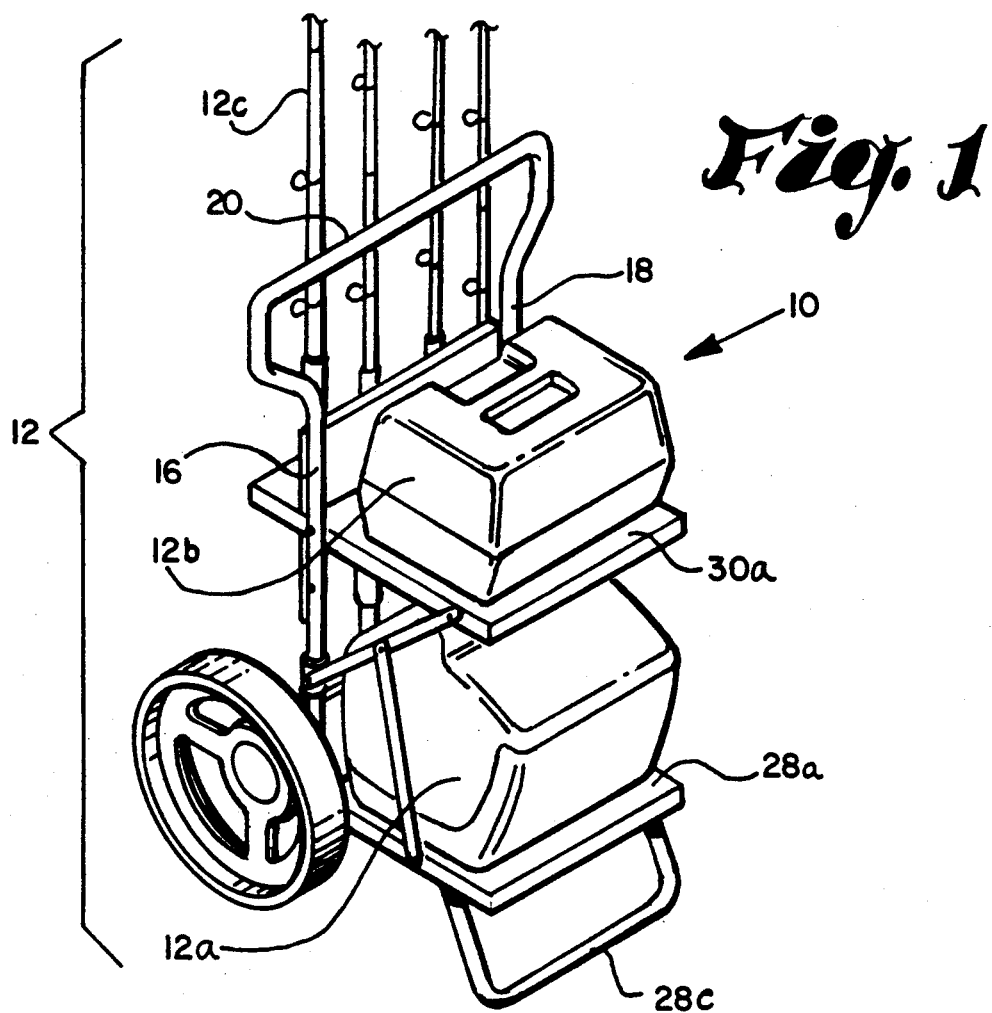
FIG. 1 is a perspective view of the invented apparatus for carrying fishing equipment, in the open or operable position.
Figure 3:
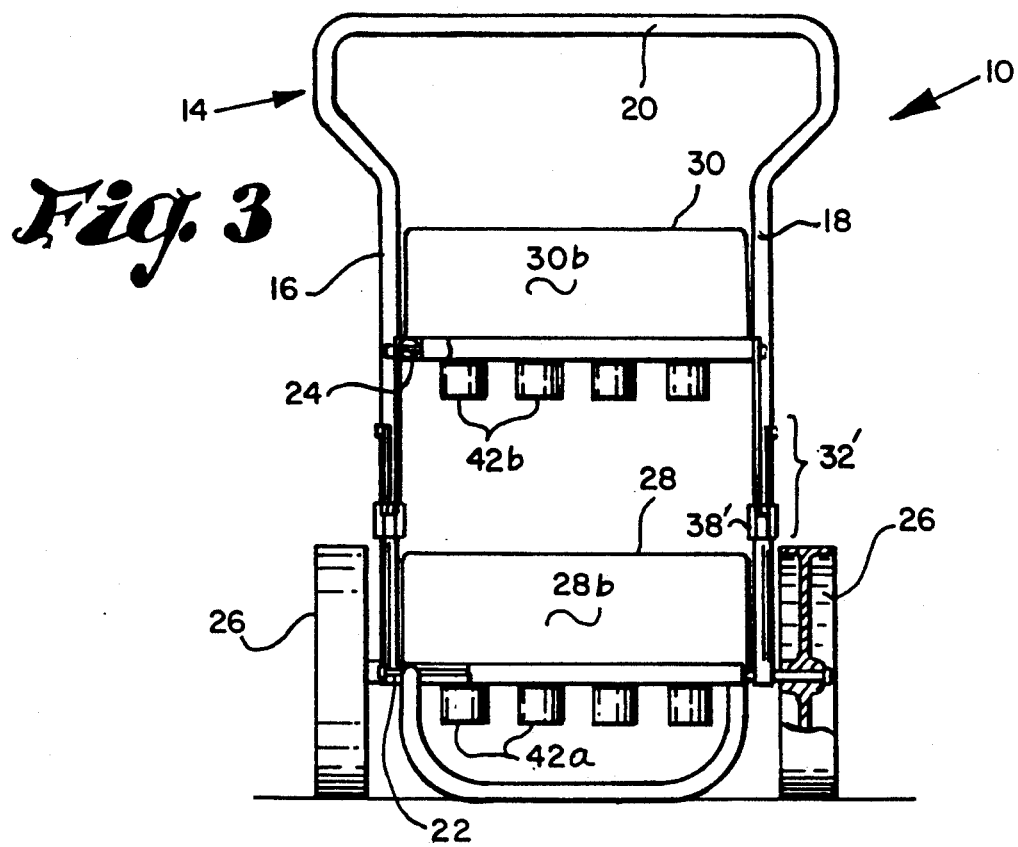
FIG. 3 is a front elevational view of the invented apparatus for carrying fishing equipment.
Figure 4:
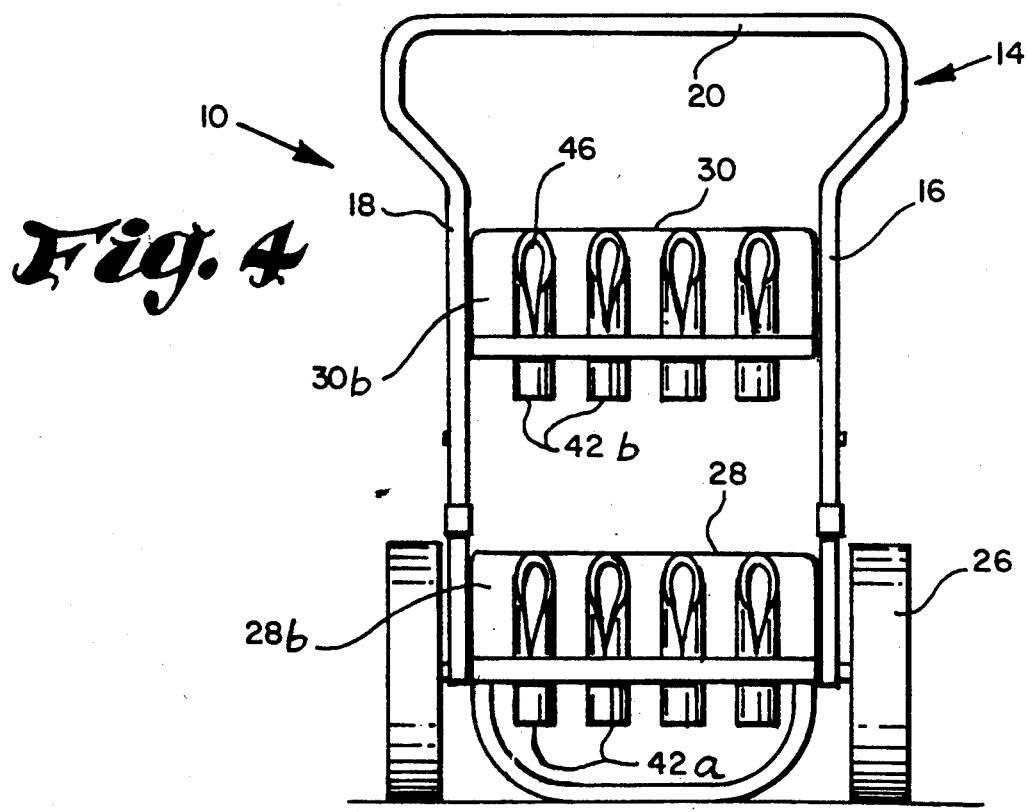
FIG. 4 is a rear elevational view of the invented apparatus for carrying fishing equipment.
Figure 5:
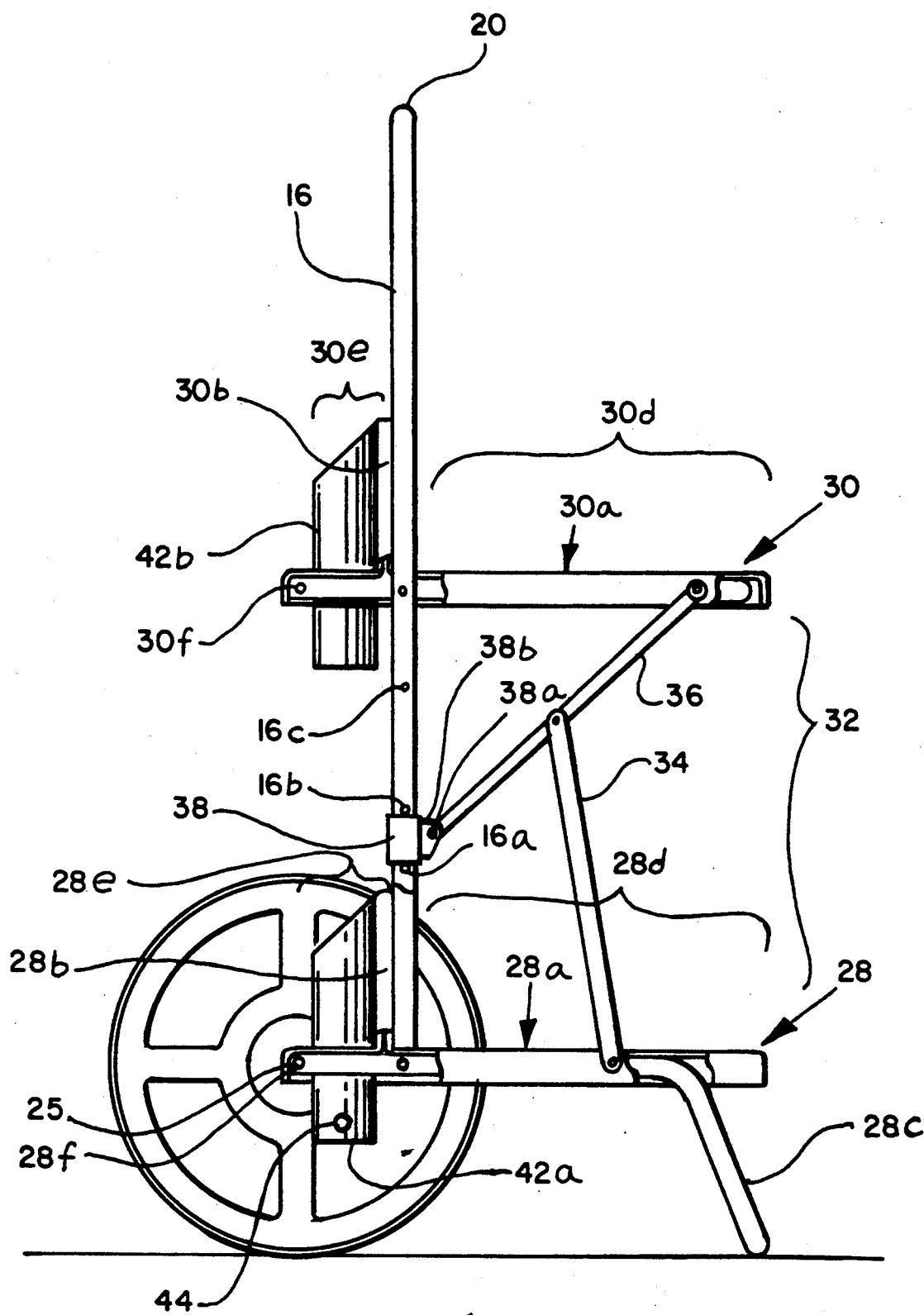
FIG. 5 is a side elevational view of the invented apparatus for carrying fishing equipment.

Referring now to the drawings, and particularly to FIG. 1, the invented apparatus 10 for carrying fishing equipment 12 is shown. As shown in FIGS. 3 and 4, the apparatus 10 is provided with a support member or brace 14, wheels 26, first and second load bearing members or shelves 28, 30. Means 32 for concurrently collapsing and opening the first and second shelves relative to the brace and means for receiving fishing rods on the apparatus, are also provided, as shown in FIG. 5. The apparatus 10 is constructed so as to support the weight of a human seated on the second shelf 30. Preferably, the apparatus 10 is constructed to weigh less than approximately 20 lbs. and to carry a load of up to approximately 200 to 250 lbs.

The brace 14 comprises two generally parallel side members or arms 16, 18, connected to one another by a top member or handle 20 by which the apparatus 10 may be gripped and moved. The handle 20 may be formed in the shape of a bow to provide for easy grasping by either the right or left hand. Preferably, the brace 14 is constructed of heavy duty steel or steel tubing. Other suitable rigid material may also be employed. The two side arms 16, 18 are also connected to one another by a first rod 22 positioned at the end of brace 14 opposite the handle 20. The first rod 22 is inserted through both side arms 16, 18, and securely mounted to the brace 14. A second rod 24 connects the side arms 16, 18 and is securely mounted thereon between the handle 20 and the first rod 22. The purpose of the each rod 22, 24 is discussed below.

A first load bearing member or shelf 28 is rotatably mounted on the first rod 22 between the side arms 16, 18 of the brace 14. The first shelf 28 preferably has a planar surface 28a for supporting fishing equipment 12, such as an ice chest 12a or a tackle box 12b, and may also be provided with a back 28b which extends upwardly from and generally perpendicular to the back end of the planar surface 28a, thereby partitioning the planar surface 28a into a front section 28d and a rear section 28e. The rear section 28e is provided with a transverse passageway 28f therethrough adapted for receiving a third rod 25. The third rod 25 is positioned through the passageway 28f and extends from both ends of the passageway for mounting of wheels 26 thereon. The first shelf 28 is preferably made of injection molded plastic, although other load bearing materials, such as metal or wood, may also be employed.

A stand 28c is provided which is disposed beneath the first shelf 28 and rotatably mounted on the first rod 22. The stand 28c is a U-shaped member with the base of the "U" bent downwardly. The top ends of the "U" are rotatably connected to the first rod 22, thereby permitting the stand 28c to rotate about the rest against a surface, such as the ground, and provide support for the apparatus 10 in either the collapsed or opened position. The stand 28c is preferably constructed of the same material as the brace 14, namely, heavy duty steel or steel tubing.

Preferably, a wheel 26 is rotatably mounted on each end of the third rod 25 for transporting the apparatus 10 and any associated equipment 12 thereon. The wheels 26 are preferably made of injection molded plastic, such as ABS plastic, although other suitable materials, such as metal, may also be employed. Air filled rubber tires may also be employed, although this is not preferred. Large sized wheels (e.g., 2½" wide, 12" diameter) have proven to be advantageous in terrain, such as sand, frequented by fishermen.

A second load bearing member or shelf 30 is rotatably mounted on the second rod 24 between the side arms 16, 18 of the brace 14. The second shelf 30 is positioned above the first shelf 28, preferably has a planar surface 30a for supporting fishing equipment 12, as with the first shelf 28, and may also be provided with a back 30b which extends upwardly from and generally perpendicular to the back end of the planar surface 30a, thereby partitioning the planar surface 30a into a front section 30d and a rear section 30e. The rear section 30e is provided with a transverse passageway 30f therethrough adapted for receiving a rod. The second shelf 30 is preferably made of injection molded plastic, although other load bearing materials, such as metal or wood, may also be employed. The first and second shelves 28, 30 are preferably constructed so as to be interchangeable, that is, they are substantially similar and may be identical. It is noted, however, that passageway 30f is unnecessary in the context of the second shelf 30. The passageway being intended to receive a wheel bearing axle.

The first and second shelves 28, 30 are interconnected by means 32 for concurrently collapsing and opening the first and second shelves relative to the brace. For discussion purposes, collapsing means 32 will be described for the left side of the apparatus 10, it being understood that collapsing means 32 includes a linkage mechanism on both sides of the apparatus 10. Collapsing means 32 includes a first connector or bar 34, a second connector or bar 36, and a slidable joint, cincture, or band 38. The band 38 is preferably made of plastic, however, other suitable materials, such as metal, may also be employed. One end of the first bar 34 is pivotally connected to the front end of the left side edge of the first shelf 28. The other end of the first bar 34 is pivotally connected to the midsection of the second bar 36. One end of the second bar 36 is pivotally connected to the front end of the left side edge of the second shelf 30. The other end of the second bar 36 is pivotally connected to the band 38. The band 38 is positioned on and is slidably engageable with the left side arm 16 of the brace 14, between the first shelf 28 and the second shelf 30. An extender 38b, having an aperture 38a, extends from the band 38 for pivotally connecting the band 38 to the second bar 36.

Figure 2:
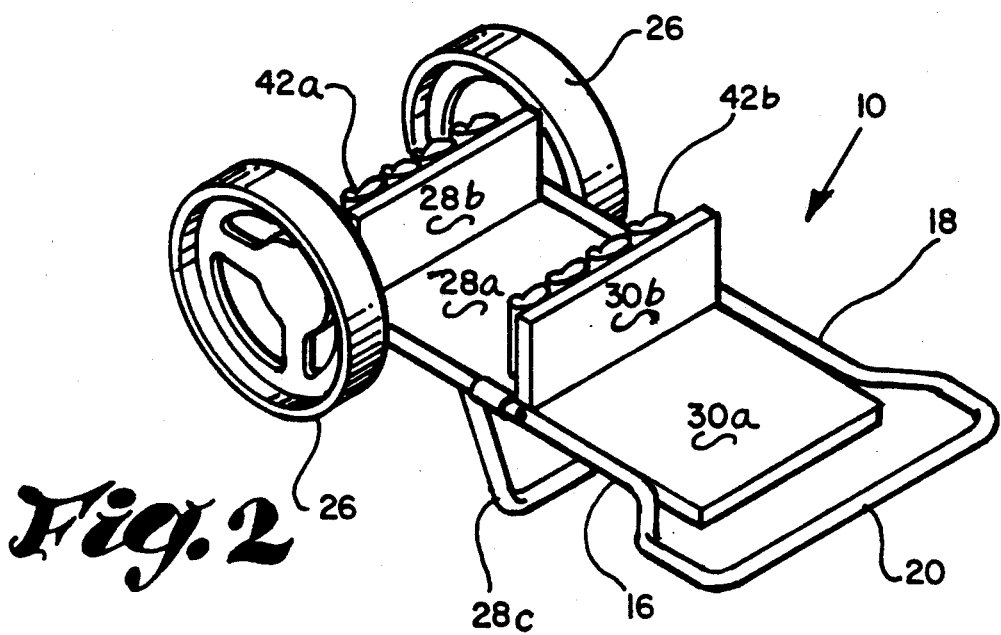
FIG. 2 is a perspective view of the invented apparatus for carrying fishing equipment, in the collapsed position.

The band 38 may be releasably engaged with the brace 14 in at least two positions: collapsed and opened. In the collapsed position, shown in FIG. 2, the planar surfaces 28a, 30a of the first and second shelves 28, 30 are rotated upwardly about their respective axes so that the planar surfaces 28a, 30a lie in the same plane as that of the brace 14. In the preferred embodiment, the dimensions of the first and second shelves 28, 30, and the relative positions of the two shelves on the brace 14, are such that, in the collapsed position, the two shelves do not overlap one another. In the opened or operable position, shown in FIG. 1, the planar surfaces 28a, 30a of the first and second shelves 28, 30 are rotated downwardly about their respective axes so that the planar surfaces 28a, 30a are generally perpendicular to that of the brace 14.

Collapsing means 32 facilitates collapsing and opening of the first shelf 28 and the second shelf 30 concurrently. In the preferred embodiment, as shown in FIG. 6, the left side arm 16 of the brace 14 is provided with a stop member 18a, a first engager 18b, and a second engager 18c. The stop member 18a, such as a metal pin or boss, extends from and is mounted on the left side arm 16 of the brace 14 beneath the band 38. The stop member 18a thus supports the band 38 and stops the band 38 from descending any further down the left side arm 16. The first and second engagers 16b, 16c also extend from and are mounted on the left side arm 16. Each engager, however, is retractable. The preferred means for retracting an engager is plunger-type rounded button which is spring-loaded within the left side arm 16, or provided with other biasing means. FIG. 6 depicts an angled connector 16d, preferably made of spring steel, which connects the first and second engagers 16b, 16c. Left side arm 16 is provided with apertures through which the first and second engagers 16b, 16c extend and retract. FIG. 7 depicts an alternative embodiment of the angled connector 16d in which the facing heads of the engagers are tapered. In the alternative embodiment, sliding the band 38 along the left side arm 16 and contacting the tapered edge of an engager with an edge of the band 38 exerts a force on the engager such that the engager is retracted and forced between the band 38 and the left side arm 16. Once the band 38 has been moved beyond the engager, the engager springs back into place thereby supporting the band in either the collapsed (second engager 16c) or open (first engager 16b) position. The bottom edge of the first engager 16b is positioned on the left side arm 16 above the top edge of the stop member 16a a distance approximately equal to the height of the band 38. Thus, positioning of the band 38 between the first engager 16b and the stop member 16a corresponds to the opened or operable position for the apparatus 10. The second engager 16c is positioned on the left side arm 16 above the first engager 16b a sufficient distance such that upon positioning the band 38 above the second engager 16c, the apparatus 10 is converted into the collapsed position. Thus, collapsing means 32 provides a linkage system between the first and second shelves 28, 30 and the brace 14 for concurrently collapsing and concurrently opening the shelves.

In the preferred embodiment, the right side of the apparatus 10 is provided with collapsing means 32' similar to the left side of the apparatus 10, which provides additional support for the second shelf 30. Band 38', however, rather than being releasably engageable with the brace 14, is simply slidably engageable with the brace 14. The right side arm 18 is typically not provided with engagers. A stop member is, however, provided. The left and right configurations for collapsing means 32 and 32' may be interchanged if desired. Thus, collapsing means 32 is operable simply by releasably engaging band 38 up and down the left side arm 16 of brace 14.

There is also provided means for receiving fishing rods on the apparatus. Preferably, four locking rod holders 42 are provided on the rear sides of the backs of the first and second shelves 28, 30. For discussion purposes, a single rod holder 42 will be described, it being understood that more than one rod holder 42 may be mounted on the apparatus 10.

A single rod holder 42 is comprised of a first tube member 42a and a second tube member 42b. The first tube member 42a, being inserted through the rear section 28e of the planar surface 28a of the first shelf 28 so as to form a channel therethrough, is mounted on the rear side of the back 28b of the first shelf 28. The second tube member 42b, being inserted through the rear section 30e of the planar surface 30a of the second shelf so as to form a channel therethrough, is mounted on the rear side of the back 30b of the second shelf 30. The first and second tube members 42a, 42b are vertically oriented and aligned with respect to one another such that the handle of a fishing rod 12c may be inserted through both the first and second tube members 42a, 42b. The bottom end of the first tube member 42a may advantageously be provided with an end cap, pin or rod stop member 44 thereon or therethrough to stop long handled fishing rods from inserted all the way through the rod holder 42 to the ground. The top end of the second tube member 42b is adapted to receive and hold a reel of the fishing rod 12c. Preferably, the top end of the second tube member 42b is provided with a slanted opening 46 facing away from the back 30b of the second shelf 30, for receiving fishing rod handles. Further, the slanted opening 46 may advantageously take an inverted raindrop shape, as shown in FIG. 4, which provides means for securing or locking a fishing rod 12c in the rod holder 42. The opening 46 is adapted for slidably engaging elements of a fishing rod 12c which extend normally from the rod handle, such a connector for connecting a fishing reel to the rod handle, thereby securing and locking the entire rod into place on the apparatus.

The apparatus 10 is extremely easy to operate. Assuming that the apparatus 10 is in the collapsed or storage position, an operator merely positions the brace 14 in an upright position, depresses the second engager 16c, downwardly rotates the second shelf 30 away from the brace 14, which slides the band 38 downwardly along the left side arm 16 of the brace 14. The first and second shelves 28, 30 are thereby rotated forward on there respective axes until the band 38 is positioned between the first engager 16b and the stop member 16a. Fishing equipment 12 may then be loaded onto the first and second shelves 28, 30, and secured thereto with straps or other securing means, if necessary. Typical equipment loaded onto the first and second shelves include an ice box 12a and a tackle box 12b. Fishing rods 12c, and accompanying reels, may also be placed in the rod holders 42. The apparatus 10 and equipment 12 thereon may then be conveniently transported from the fisherman's vehicle to the fishing site. The process is reversed in order to unload the equipment 12 and collapse the apparatus 10. Once in the collapsed position, the apparatus 10 may be stored in the fisherman's vehicle or other storage location with reduced storage requirements.

SUMMARY OF THE ACHIEVEMENT OF THE OBJECTS OF THE INVENTION

From the foregoing, it is readily apparent that I have invented an improved apparatus for carrying fishing equipment having means for collapsing and opening the apparatus, which is capable of withstanding the wear and tear typical in connection with fishing outings, and which is easy to manufacture, transport and operate, than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

I claim:

1. Apparatus for carrying fishing equipment, comprising:
   (a) a support brace comprising two generally parallel side members or arms connected to one another by a top member or handle by which the apparatus may be gripped, the two side arms being connected to one another by a first rod positioned at the end of the brace opposite the handle, the first rod being inserted through both side arms;
   (b) a first load bearing member rotatably mounted on the support brace, said first load bearing member being a shelf rotatably mounted on the first rod between the side arms of the brace;
   (c) a second load bearing member rotatably mounted on the support brace above the first load bearing member;
   (d) means connecting the first load bearing member and the second load bearing member for concurrently collapsing and opening the first and second load bearing members relative to the support brace;
   (e) means for receiving fishing rods on the apparatus;
   (f) means connected to the first load bearing member for moving the apparatus;
   (g) said shelf being provided with a planar surface for supporting fishing equipment, and a back which extends upwardly from and generally perpendicular to the planar surface, thereby partitioning the planar surface into a front section and a rear section.

2. Apparatus according to claim 1, further comprising a stand disposed beneath the first shelf and rotatably mounted on the first rod, the stand being a U-shaped member with the base of the "U" being bent downwardly and the top ends of the "U" being rotatably connected to the first rod.

3. Apparatus according to claim 1, further comprising the rear section being provided with a transverse passageway therethrough adapted for receiving a third rod, the third rod being positioned through the passageway and extending from both ends of the passageway, and a wheel rotatably mounted on each end of the third rod for transporting the apparatus and any associated equipment thereon.

4. Apparatus for carrying fishing equipment, comprising:
   (a) a support brace comprising two generally parallel side members or arms connected to one another by a top member or handle by which the apparatus may be gripped, the two side arms being connected to one another by a first rod positioned at the end of the brace opposite the handle, the first rod being inserted through both side arms;
   (b) a first load bearing member rotatably mounted on the support member;
   (c) a second load bearing member rotatably mounted on the support member above the first load bearing member, said second load bearing member being a shelf rotatably mounted on the second rod between the side arms of the brace;
   (d) means connecting the first load bearing member and the second load bearing member for concurrently collapsing and opening the first and second load bearing members relative to the support member;
   (e) means for receiving fishing rods on the apparatus;
   (f) means connected to the first load bearing member for moving the apparatus;
   (g) wherein said shelf is provided with a planar surface for supporting fishing equipment, and a back which extends upwardly from and generally perpendicular to the planar surface, thereby partitioning the planar surface into a front section and a rear section.

5. Apparatus according to claim 4, wherein the handle is shaped in the form of a bow.

6. Apparatus according to claim 4, wherein a second rod connects the side arms and is mounted on the side arms between the handle and the first rod.

7. Apparatus for carrying fishing equipment, comprising:
   (a) a support member;
   (b) a first load bearing member rotatably mounted on the support member;
   (c) a second load bearing member rotatably mounted on the support member above the first load bearing member;
   (d) means connecting the first load bearing member and the second load bearing member for concurrently collapsing and opening the first and second load bearing members relative to the support member, the collapsing means including:
      (1) a first connector having two ends;
      (2) a second connector having two ends; and
      (3) a slidable joint slidably connected to the support member;
      (4) one end of the first connector being pivotally connected to the front end of the first load bearing member and the other end of the first connector being pivotally connected to the midsection of the second connector;
      (5) one end of the second connector being pivotally connected to the front end of the second load bearing member and the other end of the second connector being pivotally connected to the slidable joint;
      (6) the slidable joint being positioned on and slidably engageable with the support member between the first load bearing member and the second load bearing member; and
      (7) means for releasably engaging the slidable joint with the support member;

(e) means for receiving fishing rods on the apparatus; and (f) means connected to the first load bearing member for moving the apparatus.

8. Apparatus according to claim 7, wherein the slidable joint is provided with releasably engaging means which includes:

(a) a stop member mounted on the support member between the first and second load bearing members and beneath the slidable joint for stopping the movement of the slidable joint;

(b) a first engager retractably mounted on the support member above the stop member a distance slightly greater than the height of the slidable joint; and (c) a second engager retractably mounted on the support member above the first engager a sufficient distance such that upon engagement of the slidable joint with the second engager, the first and second load bearing members are rotatable upwardly about their respective axes so that the load bearing members and the support member lie in generally the same plane.

9. Apparatus for carrying fishing equipment, comprising:

(a) a support member;

(b) a first load bearing member rotatably mounted on the support member;

(c) a second load bearing member rotatably mounted on the support member above the first load bearing member;

(d) means connecting the first load bearing member and the second load bearing member for concurrently collapsing and opening the first and second load bearing members relative to the support member;

(e) means for receiving fishing rods on the apparatus, including at least one rod holder mounted on the first and second load bearing members, including:

(1) a first tube member mounted on the first load bearing member which defines a first channel through the first load bearing member;

(2) a second tube member mounted on the second load bearing member which defines a second channel through the second load bearing member; and (3) the first and second tube members being vertically oriented and aligned with respect to one another such that a fishing rod handle may be inserted through both the first and second tube members, the top end of the second tube member being adapted to receive and hold a fishing rod reel; and (f) means connected to the first load bearing member for moving the apparatus.

10. Apparatus according to claim 9, wherein the top end of the second tube member defines a slanted opening facing away from the back of the second shelf for receiving fishing rod handles.

11. Apparatus according to claim 10, wherein the slanted opening is an inverted raindrop shaped opening.

* * * * *

UNITED STATES PATENT AND TRADEMARK OFFICE
CERTIFICATE OF CORRECTION

PATENT NO. :   5,203,815
DATED      :   April 20, 1993
INVENTOR(S):   Richard A. Miller It is certified that error appears in the above—identified patent and that said Letters Patent is hereby corrected as shown below:

Column 4, line 11, before "rest", insert  -- same axis as the first shelf 28. The stand 28c is thus adapted to --.

Signed and Sealed this

Thirty-first Day of May, 1994

Attest:

BRUCE LEHMAN

Attesting Officer        Commissioner of Patents and Trademarks